United States Patent [19]
Sato et al.

[11] 3,742,497
[45] June 26, 1973

[54] SAFETY DEVICE FOR VEHICLE PASSENGERS

[75] Inventors: Kazuo Sato; Tomio Hisatsune, both of Toyota; Hisashi Watanabe, Toyohashi, all of Japan

[73] Assignee: Toyota Jidosha Kogyo Kabushiki Kaisha, Toyota-shi, Japan

[22] Filed: Mar. 26, 1971

[21] Appl. No.: 128,333

[30] Foreign Application Priority Data
Aug. 19, 1970 Japan.............................. 45/72066

[52] U.S. Cl............. 343/7 ED, 343/9, 343/112 CA
[51] Int. Cl............................................. G01s 9/46
[58] Field of Search ......... 343/7 ED, 5 PD, 112 CA

[56] References Cited
UNITED STATES PATENTS

| 3,408,938 | 11/1968 | Pagazani et al. | 343/7 ED |
| 3,192,524 | 6/1965 | Bartelink | 343/7 ED |
| 3,287,724 | 11/1966 | Zapanick et al. | 343/7 ED |
| 3,442,347 | 5/1969 | Hodgson et al. | 343/7 ED |
| 3,512,155 | 5/1970 | Bloice | 343/5 PD |

Primary Examiner—Benjamin A. Borchelt
Assistant Examiner—G. E. Montone
Attorney—John J. McGlew and Alfred E. Page

[57] ABSTRACT

The Doppler effect is used to detect the imminence of a potential collision between a moving vehicle and an object in its path to provide a detecting signal for the safety of the vehicle occupants. A potential collision detecting system includes an ultrashort wave generator, a coupler connecting the generator to a transmitting and receiving antenna, a mixer-detector connected to the generator and the antenna through the coupler, an amplifier, a filter, an AC-DC converter, a comparator and a safety device for protecting vehicle occupants. The mixer-detector derives the Doppler signal and the time remaining until the occurrence of a collision is derived by converting the frequency of the Doppler signal to a signal level by means of a filter having certain frequency characteristics. The comparator converts the remaining time to a voltage and, when the voltage exceeds a predetermined value, the comparator issues a collision detecting signal to activate the safety device. The filter is a band pass filter which cuts off frequencies in the low frequency range, where operation of the safety device is not required, and in the high frequency range corresponding to a high relative velocity of the vehicle not likely to be met in practice.

5 Claims, 2 Drawing Figures

SAFETY DEVICE FOR VEHICLE PASSENGERS

BACKGROUND OF THE INVENTION

When a moving vehicle collides with another vehicle or with an obstacle in its path, a part of the vehicle body initially crashes into the obstacle or other vehicle. This crash is called the primary crash. Upon the occurrence of a primary crash, the vehicle is rapidly decelerated. Consequently, an occupant of the vehicle is thrown forward by his own inertia and strikes hard against a portion of the vehicle. As a result, the occupant can be seriously injured. Recently, various kinds of safety devices for vehicle occupants have been devised or proposed in an effort to prevent such injuries resulting from the secondary crash, or at least to minimize such injuries. The occurrence of a secondary crash varies with the relative velocity between a vehicle and an obstacle, the construction of the vehicle, the material and construction of the obstacle, and other factors. It is generally held that a secondary crash will usually occur within a quite short time interval, of the order of about 40 ms, after the instant of occurrence of a primary crash. In order to protect the safety of vehicle occupants in the event of a crash or collision, a known prior art system utilizes an air bag positioned between the occupant and the vehicle body, and adapted to be inflated upon the occurrence of a primary crash, thus preventing a secondary crash. However, it is quite difficult to complete the actuation of the safety device within such a short period of time as mentioned above.

In view of this situation, two of the present applicants have proposed, in U.S. Pat. application Ser. No. 70,692, filed Sept. 10, 1970, a system for protecting vehicle occupants, when a collision is imminent, by contactlessly detecting the imminence of a primary crash by using a Doppler radar to provide a collision detecting signal to complete actuation of the safety or protecting device prior to the occurrence of the secondary crash. Stated briefly, in this previously proposed safety system, the period of time remaining until collision of the vehicle with an obstacle in its path (this is the period of time remaining after detection of the obstacle until the occurrence of the collision, and will hereinafter be referred to as the "remaining time"), is calculated by deriving a signal proportional to the frequency of the Doppler signal, corresponding to the relative velocity between the vehicle and the obstacle, and a signal proportional to the level of the Doppler signal and corresponding to the distance between the vehicle and the obstacle in its path, such as another vehicle. The thus derived signal is utilized to actuate a safety device in accordance with the determined "remaining time."

The principle of the previously proposed collision detecting method or system will now be described. When an undulatory signal, such as sound waves or electromagnetic waves, is radiated from a vehicle, the wave reflected from an obstacle is subject to a frequency shift in conformity with the relative velocity between the vehicle and an obstacle in its path, when the vehicle and the object are moving relative to each other. This phenomenon is well known as the Doppler effect. The frequency difference between the frequency of the reflected wave and that of the radiated undulatory signal, which frequency difference will be referred to as the "Doppler signal frequency" hereinafter, is determined. This Doppler signal frequency is proportional to the relative velocity.

If we let the Doppler signal frequency be $fd$, then the following relation is established:

$$fd = 2vft/C = k_1 v \qquad (1)$$

where $v$ is the relative velocity of the vehicle and the obstacle, $ft$ is the frequency of the radiated undulatory signal, $C$ is the propagation velocity of the undulatory signal and $k_1$ is a proportionality constant.

On the other hand, the greater the distance between the vehicle and an obstacle in its path, the lower is the level of the Doppler signal. It is generally held that the level of the Doppler signal is inversely proportional to the fourth power of the distance when the distance is large, and that it is inversely proportional to the cube or square of the distance as the distance decreases. It has been confirmed from experiments that the level of the Doppler signal is almost inversely proportional to the distance if the distance is quite short (less than 10 meters), which is the distance with which the previously proposed system is chiefly concerned.

In other words, within the shortest distance (less than a few meters) where the determination of the occurrence of a collision is imminent, the relation between the level G of the Doppler signal and the distance D is determined by the following equation:

$$G = k_2/D \qquad (2)$$

where $k_2$ is the proportionality constant.

A constant voltage, proportional to the frequency $fd$ of the Doppler signal, and the voltage proportional to the level $G$ of the Doppler signal can be derived. The product S of these two values is determined as follows:

$$S \propto fd \cdot G = k_1 \cdot k_2 \cdot V/D = k \cdot 1/T \qquad (3)$$

where $k$ is a constant and $T$ is equal to $D/V$.

Thus, $T$ is the value obtained by dividing the distance by the relative velocity, and indicates the time remaining until the occurrence of a collision if the vehicle continues to approach an obstacle in its path under that condition. The previously mentioned safety device for vehicle occupants is actuated well in advance by providing a predetermined signal, known as a crash detecting signal, before the remaining time $T$ decreases below a certain value. This means the time at which the product S of equation (3) exceeds a certain value and, at such time, the crash detecting signal is provided. If the relative velocity is high, $S$ exceeds a certain value when the distance is accordingly great. In any event, the crash detecting signal is issued when the remaining time reaches a certain value and irrespective of the relative velocity of the vehicle.

In order to obtain the above-mentioned remaining time $T$, a frequency-voltage conversion circuit, for obtaining a signal proportional to the Doppler signal frequency $fd$, is connected in parallel with a detection circuit for obtaining a signal proportional to the level $G$ of the Doppler signal. Additionally, a multiplier for obtaining the product of the outputs from the two circuits is necessary.

SUMMARY OF THE INVENTION

This invention relates to safety devices for vehicle occupants of the type in which an imminent collision of the vehicle is detected contactlessly prior to the occurrence of the collision, thus preventing injuries to the vehicle occupants, and, more particularly, to a novel, improved and simplified potential collision detecting system capable of issuing a crash detecting signal.

In accordance with the present invention, a collision detecting system of simple construction, for issuing a safety device actuating signal, is based upon the provision of a predetermined frequency characteristic in at least one circuit component of a collision detecting system, for example, a filter. This provision results in a change in the operating characteristic in response to the frequency in order to derive the remaining time $T$, and thus eliminates the necessity for a frequency-voltage converter, for obtaining a signal corresponding to the relative velocity, as well as the necessity for a multiplier.

In accordance with a feature of the invention, the issuance of a collision detecting signal at a low relative velocity is prevented by providing a dead zone characteristic to the frequency responsive circuit component. The reason for this is that, when the relative velocity is too low, the actuation of a safety device for the vehicle occupants is not necessary even if the vehicle does collide with an obstacle. Such collision may be, in practice, nothing but a mere contact.

In accordance with a further feature of the invention, the operating characteristic of the circuit component is improved by providing a dead zone characteristic in the frequency range corresponding to high relative velocities in excess of a predetermined limit. The reason for this is that infinitely high relative velocities are not likely to be encountered under practical travelling conditions.

An object of the invention is to provide an improved and simplified system for detecting a potential collision.

Another object of the invention is to provide such a system in which the time remaining before a collision is determined by a circuit component having a predetermined frequency characteristic and which is responsive to a Doppler signal frequency.

A further object of the invention is to provide such a system in which no crash detecting signal is issued at a low relative velocity of the vehicle or at a relative velocity of the vehicle above a predetermined high limit.

For an understanding of the principles of the invention, reference is made to the following description of a typical embodiment thereof as illustrated in the accompanying drawing.

DESCRIPTION OF THE PREFERRED EMBODIMENT

Figure 1:
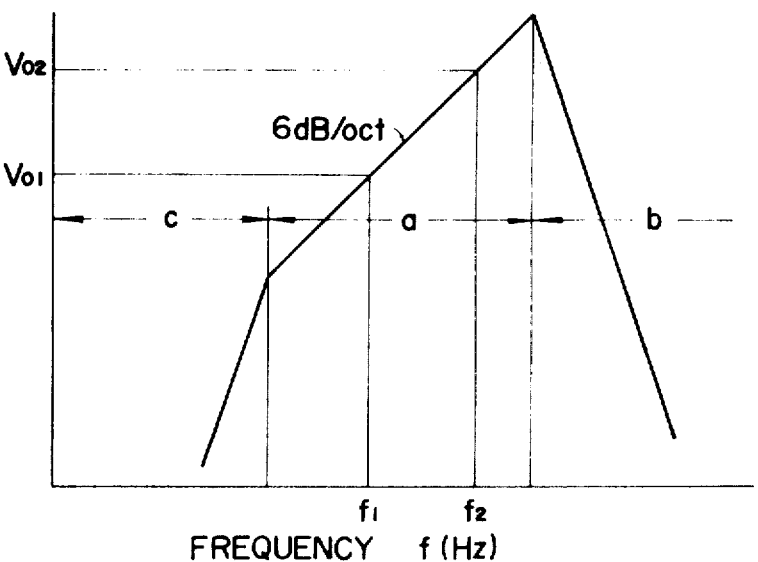
FIG. 1 is a graphical illustration of the frequency characteristic of a filter used in the present invention.

FIG. 1 illustrates the frequency characteristic of a filter having the desired frequency characteristic (6dB/oct.) for deriving the "remaining time" in the case where the level of the Doppler signal is inversely proportional to the distance. Additionally, this filter has cut-off characteristics in both the high frequency range and the low frequency range for the purposes mentioned above, and thus, in effect, is a band pass filter having relatively sharp cut-off at both the upper and lower limits of the band pass.

Referring more particularly to FIG. 1, the frequency characteristic is plotted as a curve with the Doppler frequency as the abscissa and the filter output level as the ordinate. The frequency range corresponding to the practical relative velocity range where a safety device for vehicle occupants should be operated is indicated as $a$. The characteristic of the filter in the range $a$ should be 6dB/oct. The frequency range corresponding to high relative velocities in excess of those which would be encountered under practical driving conditions is indicated at $b$, and the frequency range corresponding to a low relative velocity, wherein the operation of the safety device is not necessary even in the event of a minor collision of the vehicle, is indicated at $c$. An infinite attenuation characteristic is preferred to provide ideal cut-off of the frequency characteristic in the ranges $b$ and $c$. However, such an infinite attenuation characteristic is impossible to attain. In practice, therefore, the cut-off characteristic is to be made as steep as possible in the ranges $b$ and $c$, as indicated in FIG. 1.

The relation between the frequency $fd$ of the Doppler signal, the level $G$ of the Doppler signal and the "remaining time" $T$, when the frequency characteristic of such a filter is in the range $a$, will now be described. In the range $a$, the frequency characteristic of the filter is equal to 6dB/oct. Consequently, if the frequency $f$ is doubled, the output level $Vo$ of the filter also will be doubled.

Referring to FIG. 1, let the filter output level obtained when the Doppler signal has a frequency $f_1$ and the level $G$ as applied to the filter be $Vo_1$, and let the filter output level obtained when a Doppler signal having the frequency $f_2$ and the same level $G$ be $Vo_2$. Then the relation between the two filter output levels is determined as follows:

$$Vo_2 = (f_2/f_1) Vo_1 \qquad (4)$$

$$Vo_1 = k_3 G \qquad (5)$$

Substituting equation (1) for $f_2$ of equation (4) and substituting equations (2) and (5) for $Vo_1$, the filter output $Vo_2$ can be expressed as follows:

$$Vo_2 = (k_1 V_2/f_1) \cdot k_3 G = k_4 V_2 G = k_4 V_2 (K_2/D) \qquad (6)$$

wherein $$k_4 = k_1 k_3/f_1$$

If $f_1$ is taken as a reference frequency, it can be replaced by a constant so that equation (6) may be rewritten as follows:

$$Vo_2 = k (V_2/D) = k (1/T_2) \qquad (7)$$

where $k = k_1 k_2 k_3/f$. It will be seen from equation (7) that the filter output has the level $Vo_2$, as an electric signal corresponding to the remaining time $T_2$, at the frequency $f_2$ of the Doppler signal. In other words, when the level of the Doppler signal is inversely proportional to the distance, the time $T$ remaining until the occurrence of a collision can be calculated by converting the Doppler frequency to the Doppler level utilizing a circuit having the frequency characteristics of 6dB/oct. This eliminates the necessity for obtaining an electric signal proportional to the level of the Doppler signal and of multiplying such signal by the electric signal proportional to the Doppler frequency.

In the case where the level of the Doppler signal is inversely proportional to the square of the distance, the frequency characteristic of the circuit component of a detecting system embodying the invention should be 12dB/oct., so as to conform to the square-law characteristic. Also, if the level of the Doppler signal is inversely proportional to the cube or to the fourth power of the distance, the frequency characteristic should be 18dB/oct., or 24dB/oct., respectively. Thus, practically the same effect can be obtained.

Figure 2:
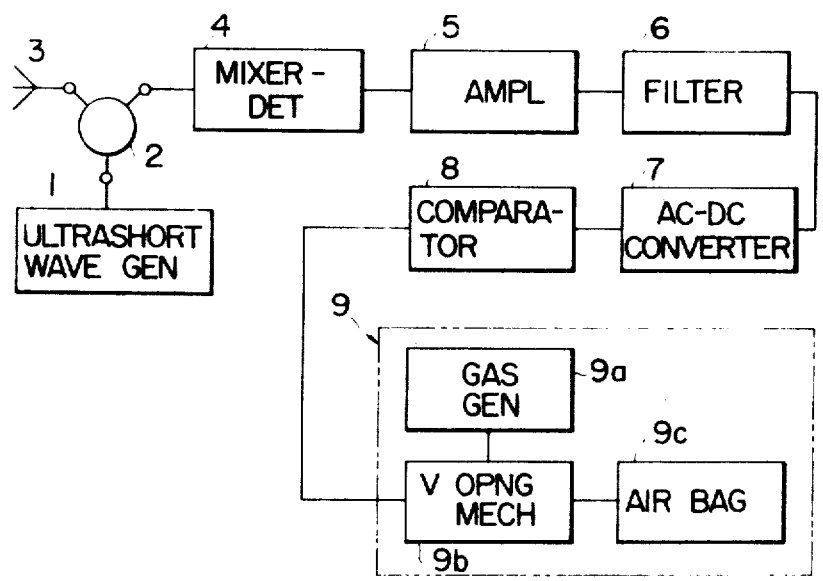
FIG. 2 is a block diagram of a collision detecting system embodying the invention.

A potential collision detecting system embodying the invention and employing a filter having the above-mentioned frequency characteristic is illustrated, in block form, in FIG. 2. Referring to FIG. 2, an ultrashort wave generator 1 is coupled, by a coupler 2, to a transmitting-receiving antenna 3, provided at a convenient location on a vehicle, and to a mixer-detector 4. The ultrashort wave generated by generator 1 is radiated transmitted from antenna 3 to coupler 2. The wave reflected from an object in the path of the vehicle is received by antenna 3 and directed through coupler 2 to mixer-detector 4 where the reflected wave is detected, after being mixed with the wave generated by generator 1 but directed directly to mixer-detector 4. There is thus obtained a signal having the difference frequency between the direct or transmitted wave and the reflected wave or, in other words, the Doppler signal, at the output of mixer-detector 4. The Doppler signal is amplified by an amplifier 5 to a value suitable for the design of the circuit and the amplified Doppler signal is fed to a filter 6.

Filter 6 has the frequency characteristic of 6dB/oct. as described in detail with reference to FIG. 1, and also has a cut-off characteristic, to provide a dead zone in the low frequency range where the operation of the safety device for vehicle occupants is not required, and a cut-off characteristic in the high frequency range corresponding to a very high relative velocity not likely to occur in practice. In order to satisfy this characteristic, there can be used a band pass filter whose pass band falls within the frequency range $a$ of FIG. 1. Needless to say, in the practically required frequency band, the dynamic range, with respect to the input and output levels for the filter and the amplifier, is designed so as to satisfy the above-described characteristic.

The Doppler signal fed to filter 6 leaves the filter as an AC signal having an amplitude level $Vo$ corresponding to the "remaining time" $T$. This AC signal is converted, by an AC-DC converter 7, into a DC voltage $V$ which is inversely proportional to the "remaining time" $T$. A comparator 8 is connected to the output of converter 7 and produces an output voltage when the input voltage thereto exceeds a predetermined value. By means of comparator 8, it is possible to determine, from the braking characteristic and the maneuvering characteristic of a traveling vehicle, the "remaining time" indicating that a collision is inevitable if a vehicle, traveling at a certain relative velocity, approaches an object in its path within a certain distance. This predetermined value can be set in advance as a voltage which is inversely proportional to the "remaining time."

When the output of converter 7 exceeds a predetermined value, comparator 8 issues an output signal, and this constitutes the "crash detecting signal" mentioned above. When the crash detecting signal is issued, a safety device 9 for vehicle occupants is operated, thus protecting the vehicle occupants against injury. Generally, safety device 9 comprises a gas generator 9a, an air bag 9c which is inflated by the gas to restrain the passenger elastically, and a valve opening mechanism 9b which connects gas generator 9a with air bag 9c upon receipt of the crash signal or the crash detecting signal. The valve opening mechanism 9b can be modified so that it is operated by the crash detecting signal which is the output of comparator 8.

In the embodiment just described, it is the filter 6 which has the frequency characteristic of 6dB/oct. However, the invention is not limited to providing the frequency characteristic in the filter. Any of the circuit components between mixer-detector 4 and AC-DC converter 7 can have such a characteristic. In addition, any other circuit component can have the frequency characteristic of 6dB/oct. As a matter of course, the frequency characteristic should be 12dB/oct. or 24dB/oct., as appropriate, if the level of the Doppler signal is inversely proportional to the square or the cube, respectively, of the distance.

With the present invention, it is possible to simplify greatly the construction of an operating circuit in which a crash detecting signal is issued by determining the "remaining time" by obtaining two signals respectively proportional to the frequency and to the level of the Doppler signal, and multiplying these two signals. Generally speaking, wide variations in temperature and severe vibration are encountered in automobiles. Consequently, simplification of the circuit construction is greatly to be desired to improve the durability, to provide proper working characteristics and to save space. The collision detecting system embodying this invention will satisfy these requirements, and thus is very useful from the practical standpoint.

In order to prevent undesired actuation of the safety device for vehicle occupants, the invention system issues a crash detecting signal only in the case of need, by employing a filter or the like having a dead zone in the low frequency range corresponding to a low relative velocity at which a collision of the vehicle which an object in its path is short of a real crash impact. In addition, a dead zone is provided in the high frequency range corresponding to excessively high relative velocities not likely to be met in practice. The filter is provided with a characteristic capable of calculating the "remaining time" in conformity with the relative relation between the level of the Doppler signal and the distance.

While a specific embodiment of the invention has been shown and described in detail to illustrate the application of the principles of the invention, it will be un-

What is claimed is:

1. In arrangements utilizing the Doppler effect to detect the imminence of a potential collision between a moving vehicle and an object in its path to provide a detecting signal for the safety of occupants of the vehicle, a potential collision detecting system comprising, in combination, an undulatory signal generator; an undulatory signal transmitter-receiver connected to said generator to transmit direct signals and to receive reflected signals; mixer-detector means connected to said generator and to said transmitter-receiver to derive a Doppler signal from the direct and reflected signals; frequency responsive circuit means connected to said mixer-detector means and providing an output AC signal having a level in proportion to the frequency of the Doppler signal produced in said mixer-detector means; AC-DC converter means connected to said circuit means and converting said output AC signal of said circuit means to a DC signal; and comparator means connected to said converter means and providing a collision detecting signal responsive to said output DC signals of said converter means exceeding a predetermined value.

2. A potential collision detecting system, as claimed in claim 1, wherein said frequency responsive circuit means comprises a filter.

3. A potential collision detecting system, as claimed in claim 1, wherein said frequency responsive circuit means comprises a band pass filter having a cut-off characteristic in the low frequency range.

4. A potential collision detecting system, as claimed in claim 1, wherein said frequency responsive circuit means comprises a band pass filter having a cut-off characteristic in the high frequency range.

5. A potential collision detecting system, as claimed in claim 1, wherein said converter means is a converter operable to convert the AC output of said filter to a DC voltage inversely proportional to said distance.

* * * * *